(12) United States Patent
Nishita

(10) Patent No.: US 11,035,670 B2
(45) Date of Patent: Jun. 15, 2021

(54) SURVEY SYSTEM AND METHOD FOR IDENTIFYING TARGET

(71) Applicant: TOPCON CORPORATION, Tokyo (JP)

(72) Inventor: Nobuyuki Nishita, Tokyo (JP)

(73) Assignee: TOPCON CORPORATION, Tokyo (JP)

(*) Notice: Subject to any disclaimer, the term of this patent is extended or adjusted under 35 U.S.C. 154(b) by 20 days.

(21) Appl. No.: 16/452,603

(22) Filed: Jun. 26, 2019

(65) Prior Publication Data

US 2020/0003558 A1    Jan. 2, 2020

(30) Foreign Application Priority Data

Jun. 29, 2018    (JP) .............................. JP2018-124860

(51) Int. Cl.
| | |
|---|---|
| *G01C 11/18* | (2006.01) |
| *G01S 7/481* | (2006.01) |
| *G01C 15/00* | (2006.01) |
| *G01S 17/66* | (2006.01) |

(52) U.S. Cl.
CPC ............ *G01C 11/18* (2013.01); *G01C 15/002* (2013.01); *G01S 7/481* (2013.01); *G01S 17/66* (2013.01)

(58) Field of Classification Search
CPC ....... G01C 11/18; G01C 15/002; G01S 7/481; G01S 17/66
See application file for complete search history.

(56) References Cited

U.S. PATENT DOCUMENTS

| | | | |
|---|---|---|---|
| 6,734,952 B2 | 5/2004 | Benz et al. | |
| 7,193,695 B2 | 3/2007 | Sugiura | |
| 2005/0189469 A1* | 9/2005 | Sugiura | ................... G01S 17/42 250/201.2 |
| 2010/0107429 A1* | 5/2010 | Berg | ...................... G01C 15/06 33/228 |
| 2016/0033270 A1* | 2/2016 | Von Matern | ............ G01S 5/163 348/169 |

FOREIGN PATENT DOCUMENTS

| | | | | |
|---|---|---|---|---|
| JP | 4177765 B2 | | 11/2008 | |
| JP | 5628648 B2 | * | 11/2014 | ........... G01C 15/002 |

* cited by examiner

*Primary Examiner* — Zhitong Chen
(74) *Attorney, Agent, or Firm* — Chiesa Shahinian & Giantomasi PC

(57) ABSTRACT

A survey system includes a survey device and a target. The survey device includes a main body rotatable around a vertical axis, a telescope supported by the main body and rotatable around a horizontal axis, a wide angle imaging unit having a second angle of view wider than a first angle of view of the telescope, and a target identification unit configured to identify a target image. The target image is identified based on a differential image between a first image captured by the wide angle imaging unit during an on-period with laser light emitted from an emission unit and a second image captured during an off-period in which laser light is not emitted from the emission unit. The target image is quickly identified even when the target is significantly separated in the horizontal direction from a position directly in front of the survey device.

7 Claims, 12 Drawing Sheets

SURVEY SYSTEM AND METHOD FOR IDENTIFYING TARGET

CROSS-REFERENCE TO RELATED APPLICATIONS

This application claims priority to Japanese Patent Application No. 2018-124860, filed on Jun. 29, 2018, the entire disclosure of which is incorporated by reference herein

TECHNICAL FIELD

The present invention relates to a survey system and a method for identifying a target.

BACKGROUND

In related art, a survey system is known that includes a survey device and a target that is collimated by the survey device (see JP 4177765 B, for example).

The survey system disclosed in JP 4177765 B is provided with a direction detector that detects a direction of guide light emitted from the target and a guide light transmitter that transmits the guide light to the target. The survey system disclosed in JP 4177765 B detects the horizontal direction by horizontally rotating a main body of the survey device and receiving the guide light from the target using the direction detector.

SUMMARY

However, the survey system disclosed in JP 4177765 B requires a horizontal rotation of the main body of the survey device until the direction detector receives the guide light having a horizontal width of approximately ±5°. Therefore, in a case that the target is significantly separated from a position directly in front of the survey device in the horizontal direction, a large amount of time is required until the horizontal direction is detected by horizontally rotating the main body of the survey device.

The invention is made to solve the problem described above, and an object of the invention is to provide a survey system that is capable of quickly identifying a target even in a case where the target is significantly separated from a position directly in front of a survey device in the horizontal direction and a method for identifying the target using the survey system.

According to the invention, the above-described problem is solved by a survey system including a survey device and a target to be collimated by the survey device. The survey device includes a main body rotatable around a vertical axis, a telescope supported by the main body and rotatable around a horizontal axis, an imaging unit having a second angle of view wider than a first angle of view of the telescope; and a target identification unit configured to identify, based on an image captured by the imaging unit, a target image in the image. The target includes an emission unit configured to emit laser light. The target identification unit is configured to identify the target image, based on a first differential image between a first image and a second image, the first image being captured by the imaging unit during an on-period in which the laser light is emitted from the emission unit, and the second image being captured by the imaging unit during an off-period in which the laser light is not emitted from the emission unit.

According to the survey system of this configuration, since the second angle of view of the imaging unit is wider than the first angle of view of the telescope, for the target not present in the first angle of view, in a case that the target is present in the second angle of view, the laser light from the target is incident on the imaging unit. In this case, the first image, which is captured by the imaging unit during the on-period in which the laser light is emitted from the emission unit, is an image including the laser light incident from the target. On the other hand, the second image, which is captured by the imaging unit during the off-period in which the laser light is not emitted from the emission unit, is an image that does not include the laser light incident from the target. The first differential image between the first image and the second image is an image from which any influence of incident light other than the laser light incident from the target is removed. Therefore, the target image in the image captured by the imaging unit is identified on the basis of the first differential image.

In this way, according to the survey system of this configuration, for the target not present in the first angle of view, in a case that the target is present in the second angle of view, the target image can be identified by capturing an image of the laser light incident from the target by the imaging unit without horizontally rotating the survey device. Thus, the target image can be quickly identified even in a case where the target is significantly separated from a position directly in front of the survey device in the horizontal direction or in the vertical direction.

In the survey system of the invention, it is preferable that the emission unit perform continuous scanning, in the vertical direction, with a fan beam having a width in the horizontal direction wider than a width in the vertical direction.

According to the survey system of this configuration, since the laser light emitted from the emission unit is the fan beam having the width in the horizontal direction wider than the width in the vertical direction, a sufficient amount of light can be transmitted over a significant distance even with a small amount of electric power. In addition, since scanning is continuously performed with the fan beam in the vertical direction, the fan beam having the narrow width in the vertical direction can be expanded to the scanning width and transmitted.

In the survey system of the invention, it is preferable that the target include an emission control unit configured to control on and off of the laser light emitted from the emission unit, the emission control unit be capable of performing a first control mode in which the on and off of the laser light is repeated at a first cycle and a second control mode in which an on-state of the laser light is maintained, the emission unit be configured to perform continuous scanning with the fan beam in the vertical direction at a second cycle shorter than the first cycle, and the target identification unit be configured to identify the target, based on the first differential image in a case that the emission control unit performs the first control mode. It is preferable that the survey device further include a target determination unit configured to determine whether the target image identified by the target identification unit is appropriate, based on a second differential image between a third image and a fourth image, the third image being captured by the imaging unit during an incident period in which the fan beam is incident on the imaging unit, and the fourth image being captured by the imaging unit during a non-incident period in which the fan beam is not incident on the imaging unit.

In a case that the target identification unit identifies the target, when there is an object other than the target that emits light at an interval equivalent to the imaging interval between the first image and the second image, the target identification unit may erroneously identify the object other than the target as the target. Thus, in the survey system of this configuration, the second cycle at which the emission unit performs continuous scanning with the fan beam in the vertical direction is set to be shorter than the first cycle at which the laser light is repeatedly turned on and off in the first control mode, and it is determined whether the target identified by the target identification unit is appropriate on the basis of the second differential image between the third image and the fourth image. Since the imaging interval between the third image and the fourth image is shorter than the imaging interval between the first image and the second image, it is possible to eliminate the object erroneously identified by the target identification unit as the target and determine whether the identified target is appropriate.

In the survey system of the invention, it is preferable that the third image and the fourth image be partial images corresponding to the target image identified by the target identification unit.

According to the survey system of this configuration, since the third image and the fourth image are partial images, a time for acquiring the third image and the fourth image from the imaging unit is significantly reduced as compared to a case of handling the entire image that can be captured by the imaging unit. Therefore, even in a case where a time for the imaging unit to acquire the entire image is longer than the second cycle, the time for the imaging unit to acquire the third image and the fourth image can be made shorter than the second cycle.

In the survey system of the invention, it is preferable that the survey device further include a first drive unit configured to rotate the main body around the vertical axis, a second drive unit configured to rotate the telescope around the horizontal axis, and a drive control unit configured to control the first drive unit and the second drive unit, and the drive control unit be configured to control the first drive unit and the second drive unit in accordance with the target image identified by the target identification unit such that the telescope is collimated on the target.

According to the survey system of this configuration, since the first drive unit and the second drive unit are controlled on the basis of the target identified by the target identification unit, a state can be obtained in which the target is placed within the first angle of view of the telescope and the target is collimated by the telescope.

In the survey system of the invention, it is preferable that the emission unit include a polygon mirror including a plurality of reflection surfaces formed at equal intervals along a circumferential surface of the polygon mirror and being rotatable around a horizontal axis, a rotation drive unit configured to rotate the polygon mirror, and a laser light source configured to emit the laser light toward the circumferential surface of the polygon mirror.

According to the survey system of this configuration, continuous scanning with the fan beam can be performed in the vertical direction by causing the rotation drive unit to rotate the polygon mirror and irradiating the circumferential surface of the polygon mirror with the laser light.

In the survey system of the invention, it is preferable that the survey device further include a tracking light transmission unit configured to emit tracking light toward the target and a tracking light receiving unit configured to receive the tracking light reflected by the target, and the target further include a prism configured to reflect the tracking light emitted from the tracking light transmission unit in an incident direction of the tracking light. Further, it is preferable that the drive control unit be configured to control the first drive unit and the second drive unit, based on a received light image of the tracking light receiving unit, such that the prism is arranged on a collimation axis of the telescope.

According to the survey system of this configuration, it is possible to control the first drive unit and the second drive unit on the basis of the received light image of the tracking light receiving unit and to maintain a state in which the prism is arranged on the collimation axis of the telescope.

According to the invention, the above-described problem is solved by a method for identifying a target in a survey system including a survey device and a target to be collimated by the survey device. The survey device includes a main body rotatable around a vertical axis, a telescope supported by the main body and rotatable around a horizontal axis, and an imaging unit having a second angle of view wider than a first angle of view of the telescope. The target includes an emission unit configured to emit laser light. The method for identifying the target includes capturing a first image with the imaging unit during an on-period in which the laser light is emitted from the emission unit, capturing a second image by the imaging unit during an off-period in which the laser light is not emitted from the emission unit, and identifying a target image in an image captured by the imaging unit, based on a first differential image between the first image and the second image.

According to the method for identifying the target of this configuration, for the target not present in the first angle of view of the telescope, in a case that the target is present in the second angle of view of the imaging unit, the target image can be identified by capturing an image of the laser light incident from the target by the imaging unit without horizontally rotating the survey device. Thus, the target image can be quickly identified even in a case where the target is significantly separated from a position directly in front of the survey device in the horizontal direction or in the vertical direction.

According to the invention, it is possible to provide a survey system that is capable of quickly identifying a target image even in a case where a target is significantly separated from a position directly in front of a survey device in the horizontal direction, and a method for identifying the target using the survey system.

DETAILED DESCRIPTION

A survey system 300 according to an embodiment of the invention will be described below with reference to the drawings.

Figure 1:
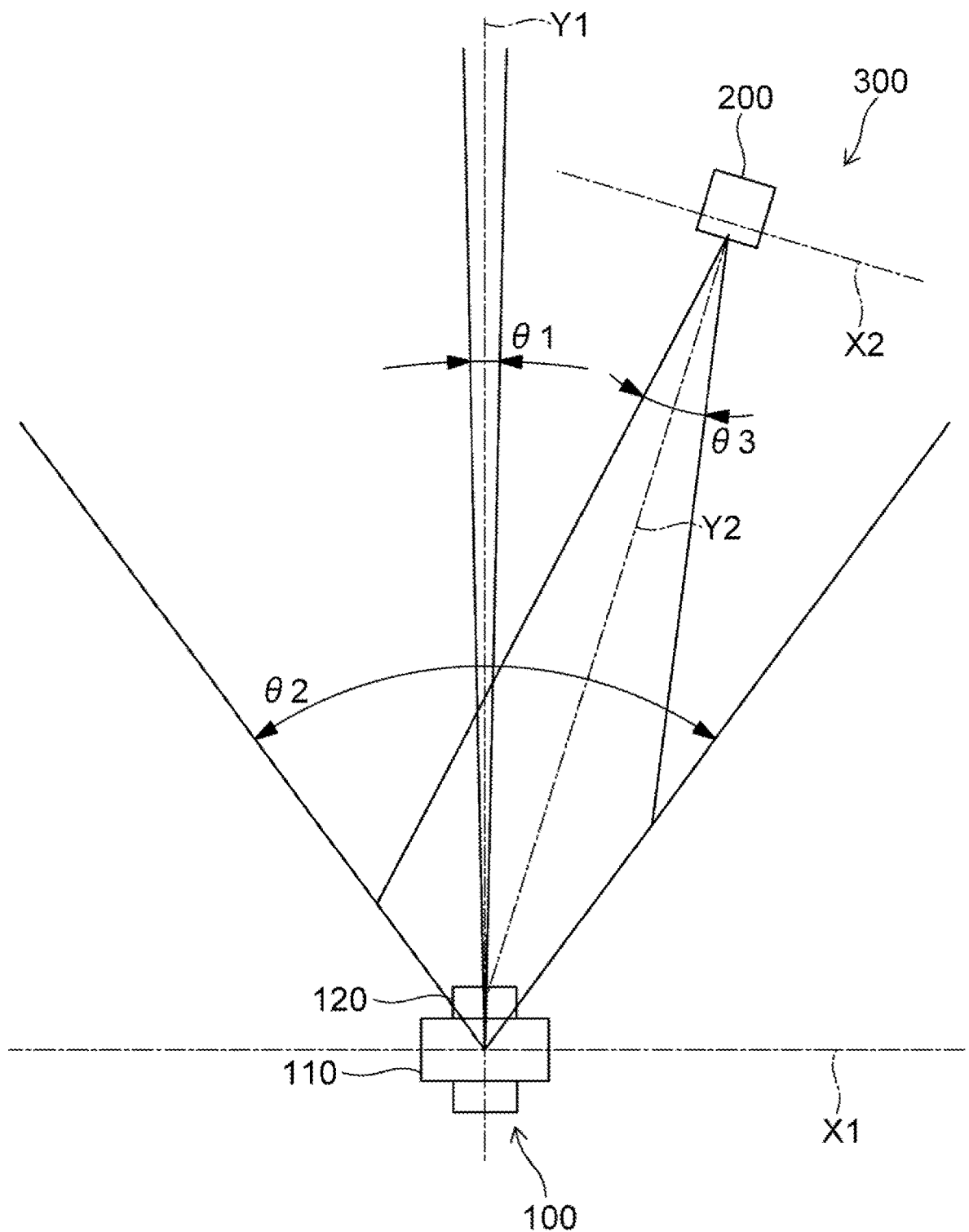
FIG. 1 is a plan view illustrating a survey system according to an embodiment of the invention.
Figure 2:
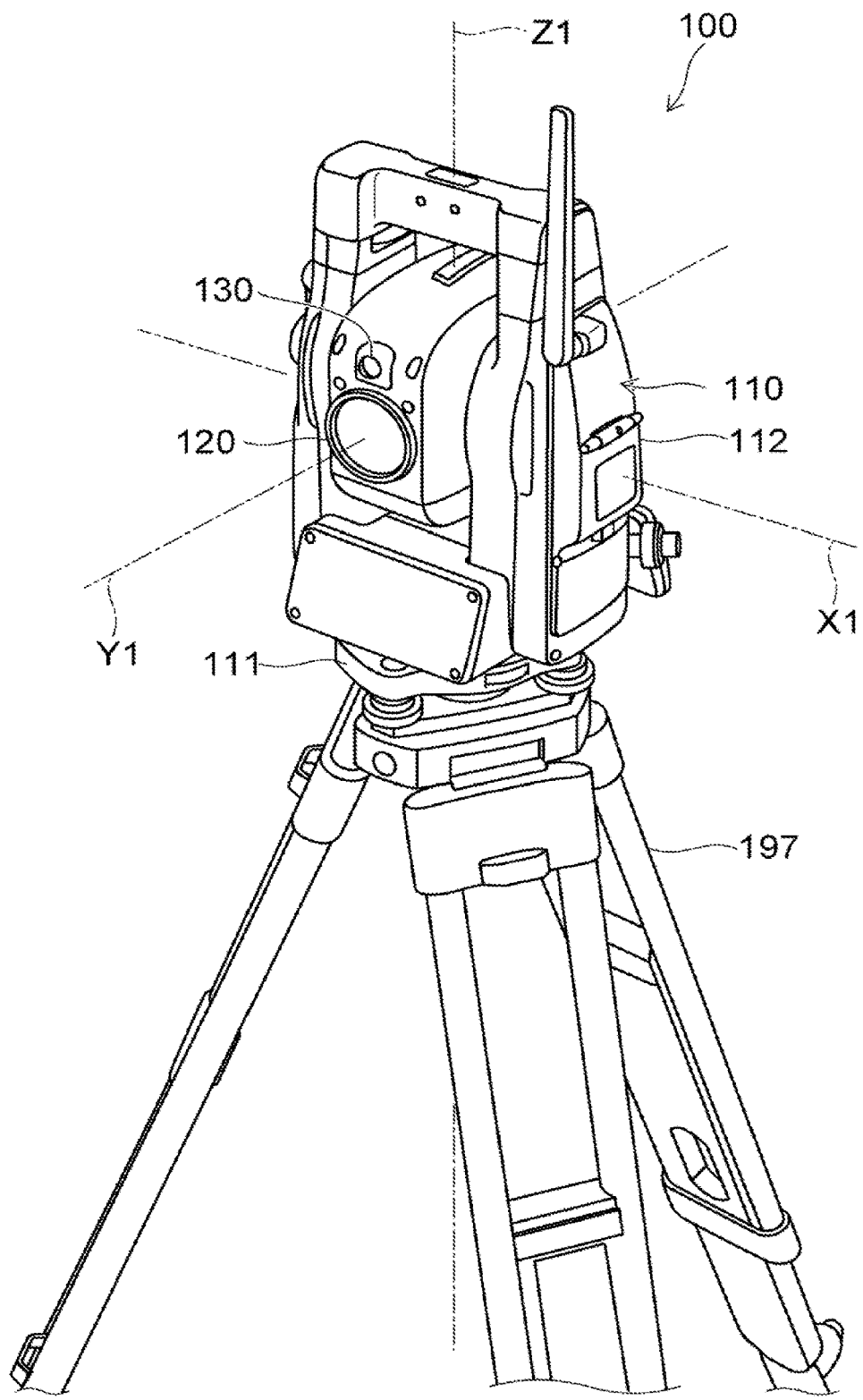
FIG. 2 is a perspective view of a survey device illustrated in FIG. 1.
Figure 3:
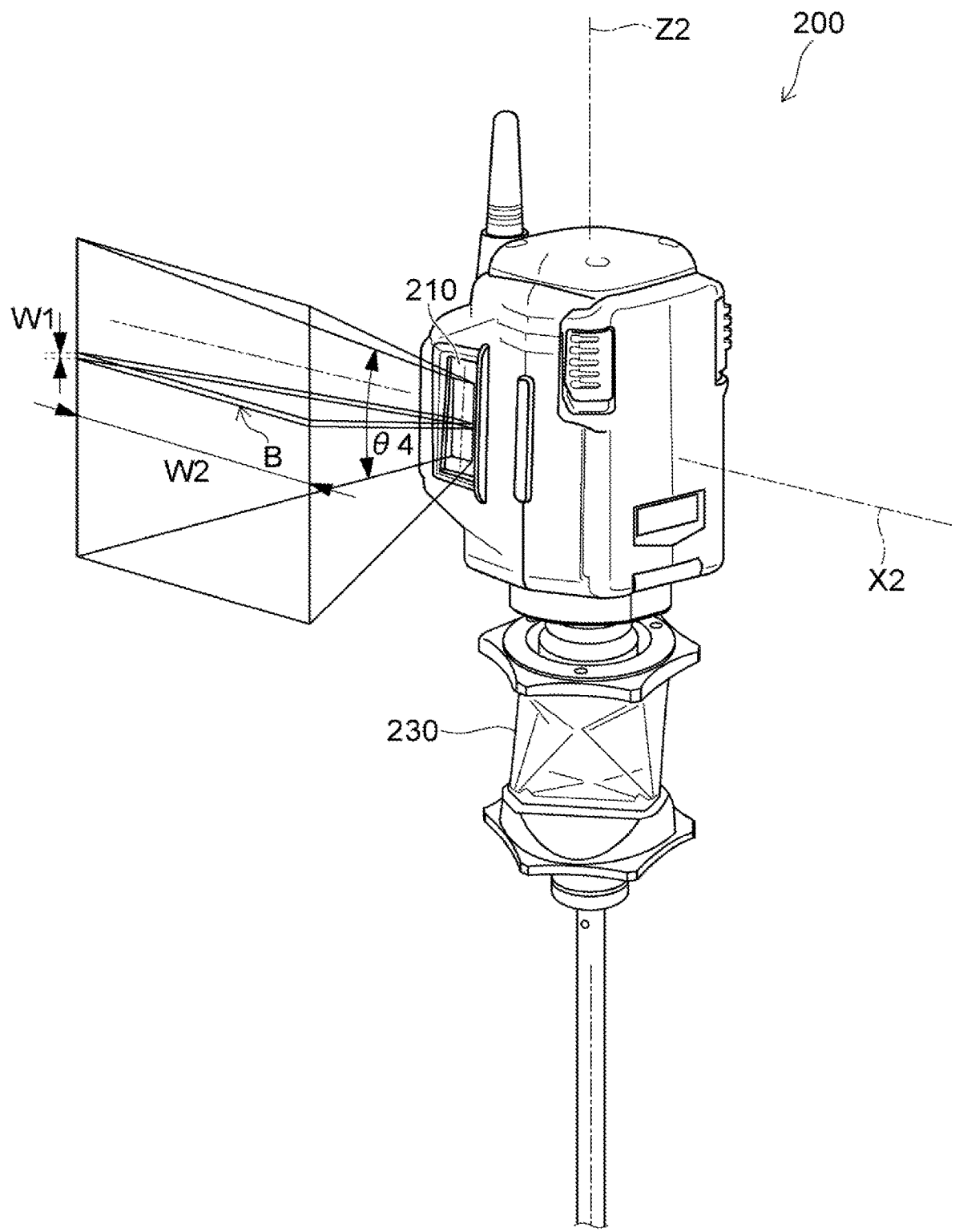
FIG. 3 is a perspective view of a target illustrated in FIG. 1.
Figure 4:
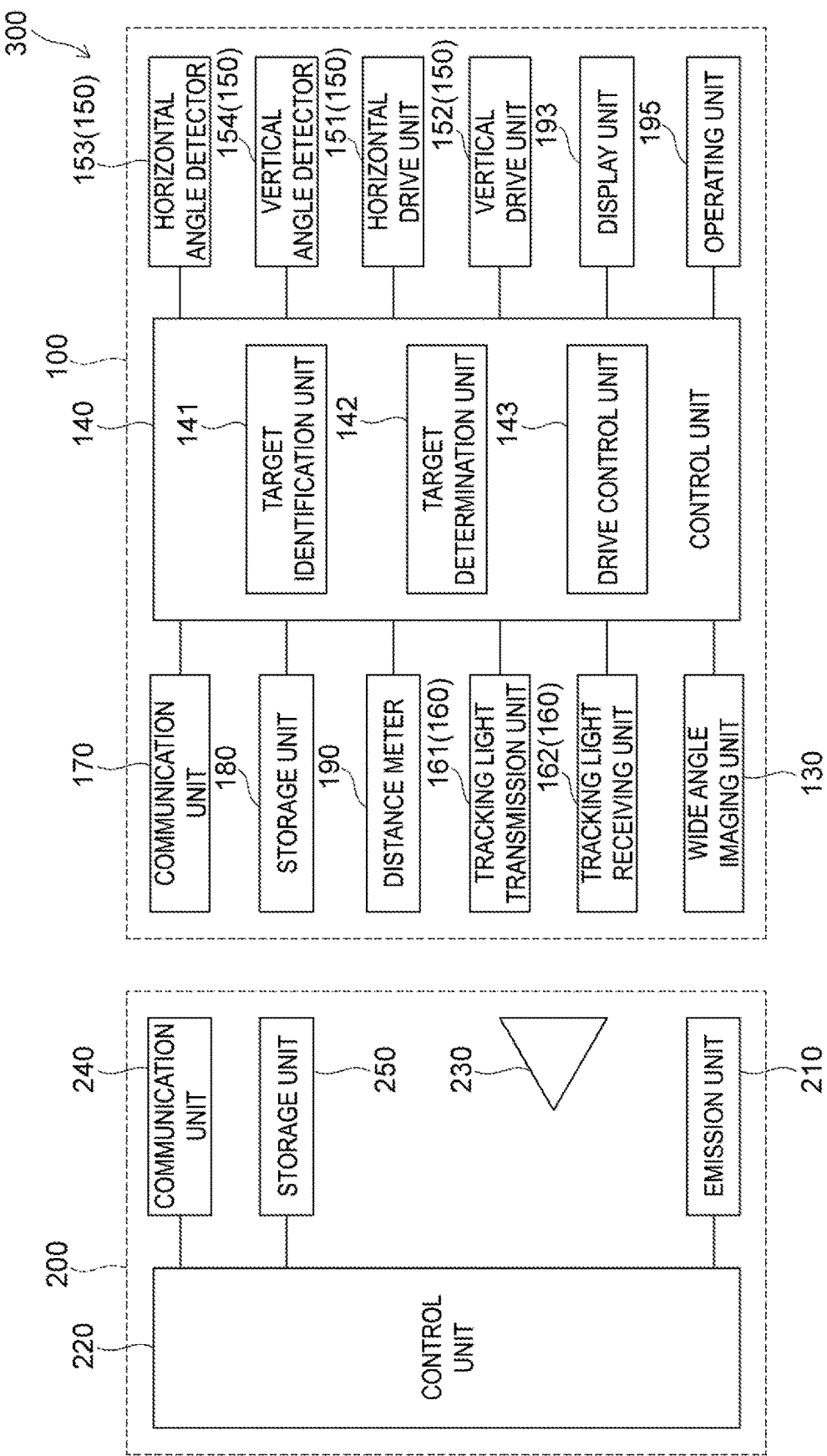
FIG. 4 is a configuration diagram of the survey system illustrated in FIG. 1.
Figure 5:
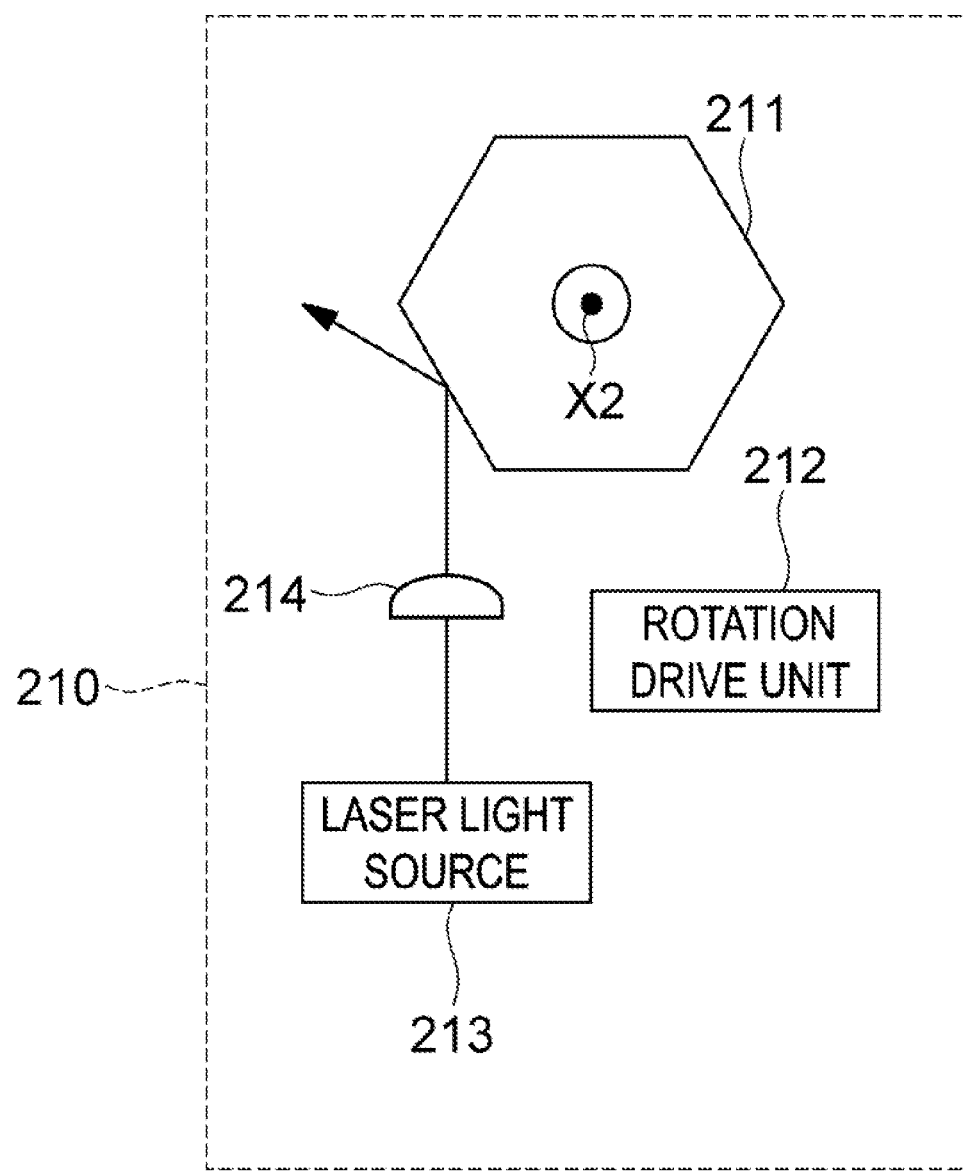
FIG. 5 is a configuration diagram of an emission unit illustrated in FIG. 4.

FIG. 1 is a plan view illustrating a survey system 300 according to the present embodiment. FIG. 2 is a perspective view of a survey device 100 illustrated in FIG. 1. FIG. 3 is a perspective view of a target 200 illustrated in FIG. 1. FIG. 4 is a configuration diagram of the survey system 300 illustrated in FIG. 1. FIG. 5 is a configuration diagram of an emission unit 210 illustrated in FIG. 4.

As illustrated in FIG. 1, the survey system 300 of the present embodiment includes the survey device 100 and the target 200 that is collimated by the survey device 100. The survey system 300 of the present embodiment is a system that collimates the target 200 using the survey device 100 and measures, angles of the target 200 with respect to a collimation axis Y1 of the survey device 100 in the horizontal direction and the vertical direction, and a distance from the survey device 100 to the target 200.

Here, the survey device 100 included in the survey system 300 will be described.

As illustrated in FIG. 2 and FIG. 4, the survey device 100 includes a main body 110, a telescope 120, a wide angle imaging unit 130, a control unit 140, a drive unit 150, a tracking unit 160, a communication unit 170, a storage unit 180, a distance meter 190, a display unit 193, an operating unit 195, and a tripod 197.

The main body 110 includes a leveling stand 111 attached to the tripod 197 installed on the ground and a housing 112 installed on the leveling stand 111. The leveling stand 111 is provided with a mechanism for adjusting a mounting surface of the housing 112 installed on the tripod 197 to be horizontal. The housing 112 is rotatable in the horizontal direction around a vertical axis Z1, in a state of being attached to the leveling stand 111.

The telescope 120 is a device that includes an optical system that collimates the target 200. The telescope 120 is supported by the main body 110 and is rotatable in the vertical direction around a horizontal axis X1. As illustrated in FIG. 1, a first angle of view of the telescope 120 is θ1 centered on the collimation axis Y1 that is orthogonal to the horizontal axis X1. θ1 is from 1° to 2°, for example.

The wide angle imaging unit 130 is a device that captures an image of an ambient environment, which is a subject. A second angle of view of the wide angle imaging unit 130 is θ2 centered on the collimation axis Y1. The second angle of view θ2 is wider than the first angle of view θ1, and is from 30° to 90°, for example.

As the wide angle imaging unit 130, a Complementary Metal Oxide Semiconductor (CMOS) area image sensor can be employed, for example. The CMOS area image sensor can read out only a partial pixel area, which is a part of an entire pixel area that can be imaged, as a partial image. By reading out the partial image, a frame rate can be increased by reducing a read-out time per image compared to reading out an image of the entire pixel area.

The control unit 140 is a device that controls each component of the survey device 100 and is configured by a Central Processing Unit (CPU), a Random Access Memory (RAM), a Read Only Memory (ROM), a computer-readable storage medium, and the like.

The control unit 140 includes a target identification unit 141, a target determination unit 142, and a drive control unit 143. Each of the components included in the control unit 140 functions as a result of the CPU executing a program read out from the ROM, the storage medium, or the like.

On the basis of the image captured by the wide angle imaging unit 130, the target identification unit 141 identifies a target image TG that indicates the target 200 in the image.

The target determination unit 142 determines whether the target image TG identified by the target identification unit 141 is appropriate.

Specific processing performed by the target identification unit 141 and the target determination unit 142 will be described below.

The drive control unit 143 controls a horizontal drive unit 151 and a vertical drive unit 152 by transmitting control commands. The drive control unit 143 can rotate the main body 110 around the vertical axis Z1 toward any position in the horizontal direction by controlling the horizontal drive unit 151. Further, the drive control unit 143 can rotate the telescope 120 around the horizontal axis X1 toward any position in the vertical direction by controlling the vertical drive unit 152.

The drive unit 150 includes the horizontal drive unit 151, the vertical drive unit 152, a horizontal angle detector 153, and a vertical angle detector 154. The horizontal drive unit 151 rotates the main body 110 in the horizontal direction around the vertical axis Z1 using a driving force generated by a motor (not illustrated). The vertical drive unit 152 rotates the telescope 120 in the vertical direction around the horizontal axis X1 using the driving force generated by the motor (not illustrated).

The horizontal angle detector 153 is a sensor that detects a horizontal rotation angle of the main body 110 with respect to a reference position in the horizontal direction. The horizontal angle detector 153 detects the horizontal rotation angle of the main body 110 and transmits the detected rotation angle to the drive control unit 143. The drive control unit 143 controls the horizontal position of the main body 110 such that the horizontal rotation angle transmitted from the horizontal angle detector 153 is a desired target value.

The vertical angle detector 154 is a sensor that detects a vertical rotation angle of the telescope 120 with respect to a reference position in the vertical direction. The vertical angle detector 154 detects the vertical rotation angle of the telescope 120 and transmits the detected rotation angle to the drive control unit 143. The drive control unit 143 controls the vertical position of the telescope 120 such that the vertical rotation angle transmitted from the vertical angle detector 154 is a desired target value.

The tracking unit 160 includes a tracking light transmission unit 161 and a tracking light receiving unit 162. The tracking unit 160 emits tracking light from the tracking light transmission unit 161 toward a prism 230 of the target 200 and receives the tracking light reflected by the prism 230 with the tracking light receiving unit 162. A received light image of the tracking light received by the tracking light receiving unit 162 is an image that indicates a deviation, in the horizontal direction and the vertical direction, between the collimation axis Y1 of the telescope 120 and the center of the prism 230. The drive control unit 143 controls the horizontal drive unit 151 and the vertical drive unit 152 on the basis of the received light image of the tracking light received by the tracking light receiving unit 162, such that the center of the prism 230 is arranged on the collimation axis Y1 of the telescope 120.

The communication unit 170 performs communication with the target 200. The communication unit 170 receives time information on the target 200 from the target 200 and transmits time information on the survey device 100 to the target 200, for example.

The storage unit 180 is a device that stores images captured by the wide angle imaging unit 130, information received by the communication unit 170, various types of information processed by the control unit 140, and the like.

The distance meter 190 is a device that measures a distance to the target 200 by emitting distance measuring light toward the target 200 and receiving the distance measuring light reflected by the target 200.

The display unit 193 is a device that displays the various types of information processed by the control unit 140 of the survey device 100 and notifies the information to an operator of the survey device 100.

The operating unit 195 is a device that receives an operation by the operator of the survey device 100 and allows various settings of the survey device 100 and instructions for the control unit 140 to be input.

Next, the target 200 included in the survey system 300 will be described.

The target 200 includes the emission unit 210 that emits laser light, a control unit 220, the prism 230, a communication unit 240, and a storage unit 250.

As illustrated in FIG. 3, the emission unit 210 is a device that emits a fan beam B having a width W2 in the horizontal direction wider than a width W1 in the vertical direction and continuously performs scanning in the vertical direction. As illustrated in FIG. 5, the emission unit 210 includes a polygon mirror 211, a rotation drive unit 212, a laser light source 213, and a lens unit 214.

The polygon mirror 211 is a rotating body that has six reflection surfaces formed at equal intervals along a circumferential surface thereof and that is rotatable around a horizontal axis X2.

The rotation drive unit 212 generates a driving force, transmits the driving force to the polygon mirror 211, and thereby rotates the polygon mirror 211 around the horizontal axis X2. The laser light source 213 is a device that emits the laser light toward the circumferential surface of the polygon mirror 211. A cylindrical lens included in the lens unit 214 is a member that linearly condenses the laser light incident from the laser light source 23.

The laser light emitted from the laser light source 23 becomes a parallel luminous flux at a collimating lens included in the lens unit 214 and is incident on the reflective surface of the polygon mirror 211. The laser light reflected by the reflection surface of the polygon mirror 211 is emitted as the fan beam B having the width W2 in the horizontal direction wider than the width W1 in the vertical direction. A horizontal beam angle θ3 of the fan beam B illustrated in FIG. 1 is preferably from 10° to 30°, for example. Further, a vertical scanning width θ4 illustrated in FIG. 3 is preferably from 90° to 150°, for example.

The control unit (emission control unit) 220 is a device that controls each component of the target 200 and is configured by a Central Processing Unit (CPU), a Random Access Memory (RAM), a Read Only Memory (ROM), a computer-readable storage medium, and the like. The control unit 220 controls on and off of the laser light emitted by the emission unit 210.

The prism 230 is a device that reflects the tracking light emitted from the tracking light transmission unit 161 of the survey device 100 toward an incident direction of the tracking light. The communication unit 240 performs communication with the survey device 100. For example, the communication unit 240 receives the time information on the survey device 100 from the survey device 100 and transmits the time information on the target 200 to the survey device 100. The storage unit 250 is a device that stores information received by the communication unit 240, various types of information processed by the control unit 220, and the like.

Figure 6:
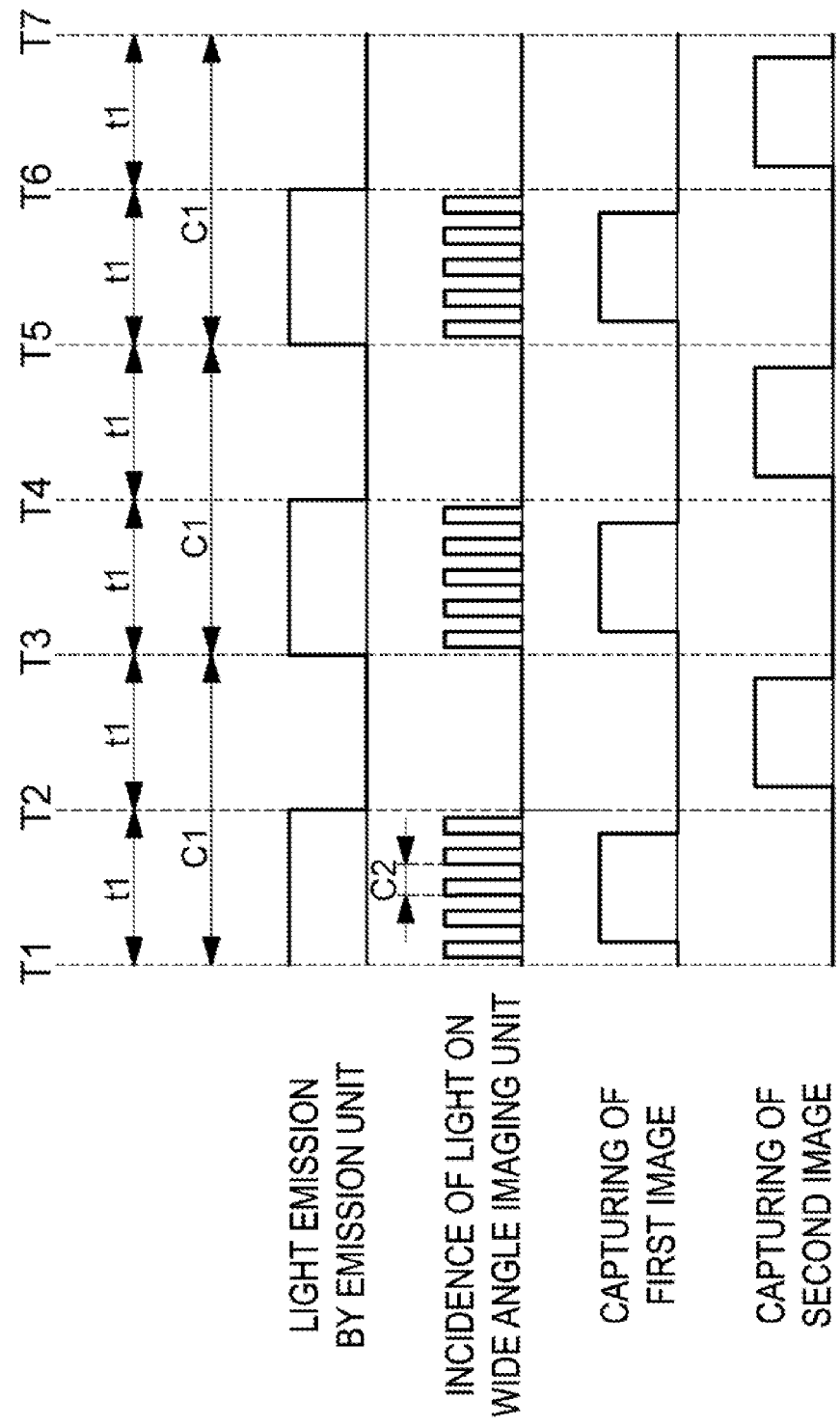
FIG. 6 is a timing chart illustrating timings of light emission by the emission unit of the survey system illustrated in FIG. 1, incidence of the light on a wide angle imaging unit, capturing of a first image, and capturing of a second image.
Figure 7:
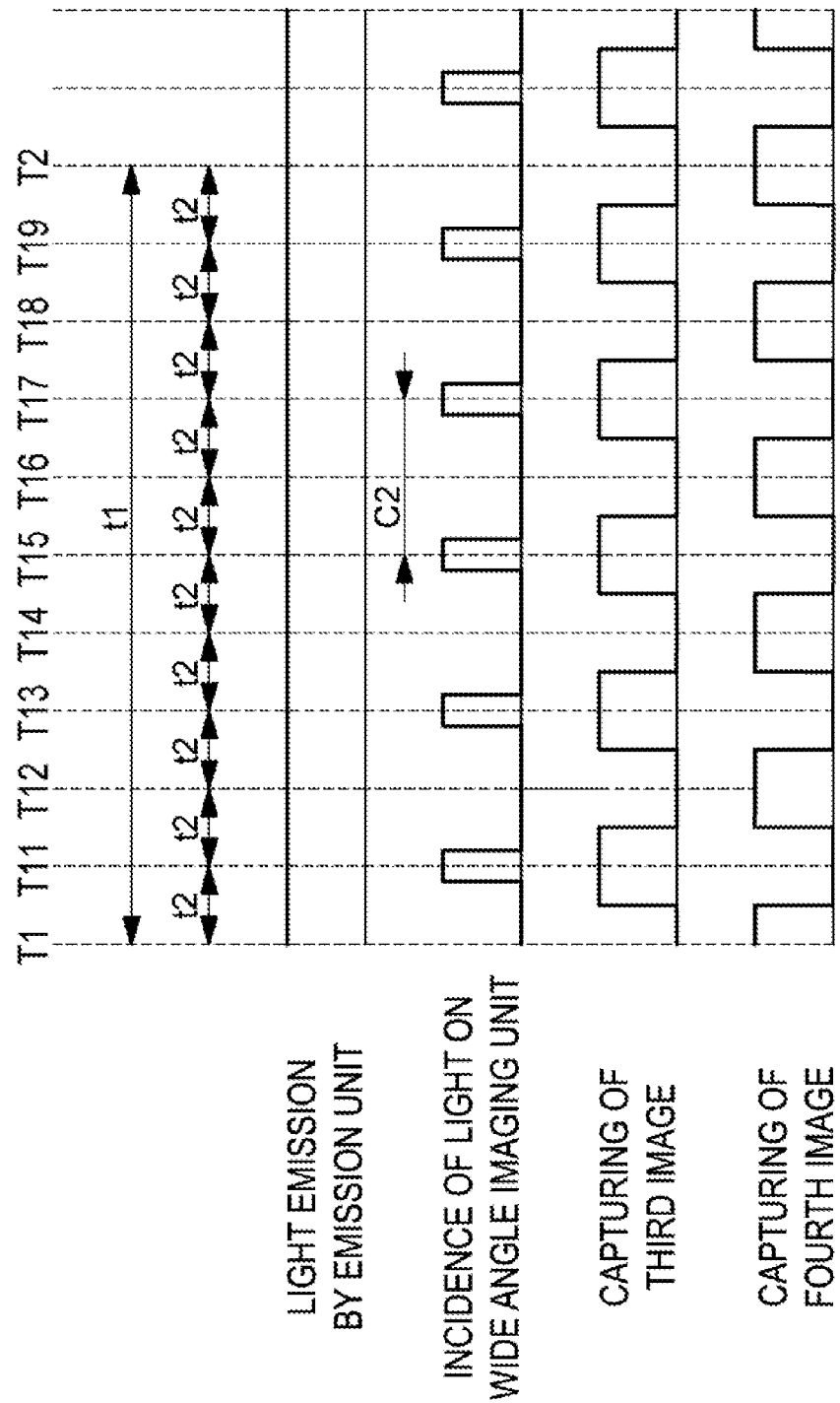
FIG. 7 is a timing chart illustrating timings of the light emission by the emission unit of the survey system illustrated in FIG. 1, incidence of the light on a wide angle imaging unit, capturing of a third image, and capturing of a fourth image.

Next, with reference to FIG. 6 and FIG. 7, a first control mode and a second control mode, which are performed by the control unit 220 of the target 200, will be described. FIG. 6 illustrates a timing chart in a case that the control unit 220 performs the first control mode, and FIG. 7 illustrates a timing chart in a case that the control unit 220 performs the second control mode.

FIG. 6 is a timing chart illustrating timings of light emission by the emission unit 210 of the survey system 300 illustrated in FIG. 1, incidence of the light on the wide angle imaging unit 130, capturing of a first image, and capturing of a second image. FIG. 7 is a timing chart illustrating timings of the light emission by the emission unit 210 of the survey system 300 illustrated in FIG. 1, incidence of the light on the wide angle imaging unit 130, capturing of a third image, and capturing of a fourth image. Each of times T1 to T7 in FIG. 6 is a time separated by a fixed time interval t1. Each of times T1 to T19 in FIG. 7 is a time separated by a fixed time interval t2, which is shorter than the time interval t1.

Here, the first control mode performed by the control unit 220 of the target 200 will be described with reference to FIG. 6. The first control mode is a mode in which the laser light source 213 for emitting the laser light is repeatedly turned on and off at a first cycle C1. As illustrated in FIG. 6, in each of time periods (an on-period) from the time T1 to T2, from the time T3 to T4, and from the time T5 to T6, the laser light source 213 for emitting the laser light in the emission unit 210 is turned on. On the other hand, in each of time periods (an off-period) from the time T2 to T3, from the time T4 to T5, and from the time T6 to T7, the laser light source 213 for emitting the laser light in the emission unit 210 is turned off.

As illustrated in FIG. 6, in a case that the control unit 220 of the target 200 performs the first control mode, the laser light is intermittently incident on the wide angle imaging unit 130, at a second cycle C2 shorter than the first cycle C1. The reason for the laser light being intermittently incident on the wide angle imaging unit 130 at the second cycle C2 is because the laser light enters the wide angle imaging unit 130 only when the laser light passes through a part of a region of the vertical scanning width θ4 illustrated in FIG. 3. The second cycle C2 corresponds to a time calculated by dividing a rotation cycle of the polygon mirror 211 by the number of reflection surfaces thereof.

In FIG. 6, a timing chart corresponding to the "capturing of the first image" illustrates timings at which the wide angle imaging unit 130 captures an image (a first image IM1) during the on-period in which the laser light is emitted from the emission unit 210. Each of the time periods at a high level in the timing chart is the time period in which the first image IM1 is captured. The time period in which the first image IM1 is captured is sufficiently longer than the second cycle C2 in order to obtain a sufficient amount of the laser light intermittently incident on the wide angle imaging unit 130.

In FIG. 6, a timing chart corresponding to the "capturing of the second image" illustrates timings at which the wide angle imaging unit 130 captures an image (a second image IM2) during the off-period in which the laser light is not emitted from the emission unit 210. Each of the time periods at the high level in the timing chart is the time period in which the second image IM2 is captured. The time period in which the second image IM2 is captured is equal to the time period in which the first image IM1 is captured. This is in order to have the same imaging conditions for the first image IM1 and the second image IM2 and also to have the same pixel values in other positions excluding positions on which the laser light is incident for the first image IM1 and the second image IM2.

Next, the second control mode performed by the control unit 220 of the target 200 will be described with reference to FIG. 7. The second control mode is a mode in which an on-state in which the laser light source 213 emits the laser light is maintained. As illustrated in FIG. 7, at any time from the time T1 to T2, the laser light source 213 for emitting the laser light in the emission unit 210 is maintained at the on-state.

In FIG. 7, a timing chart corresponding to the "capturing of the third image" illustrates timings when the wide angle imaging unit 130 captures an image (a third image IM3) during an incident period (before and after the time T11, before and after the time T13, before and after the time T15, before and after the time T17, and before and after the time T19) in which the laser light (the fan beam) emitted from the emission unit 210 is incident on the wide angle imaging unit 130. The time period in which the third image IM3 is captured is sufficiently longer than the time period in which the laser light is incident on the wide angle imaging unit 130 in order to reliably obtain a sufficient amount of the laser light incident on the wide angle imaging unit 130, even in a case where the timings are slightly incorrect.

In FIG. 7, a timing chart corresponding to the "capturing of the fourth image" illustrates timings when the wide angle imaging unit 130 captures an image (a fourth image IM4) during a non-incident period (before and after the time T12, before and after the time T14, before and after the time T16, before and after the time T18, and before and after the time T2) in which the laser light emitted from the emission unit 210 is not incident on the wide angle imaging unit 130. The time period in which the fourth image IM4 is captured is equal to the time period in which the third image IM3 is captured. This is in order to have the same imaging conditions for the third image IM3 and the fourth image IM4 and also to have the same pixel values in other positions excluding positions on which the laser light is incident for the third image IM3 and the fourth image IM4.

Next, operations performed by the survey device 100 will be described with reference to FIG. 8 and FIG. 9.

Figure 8:
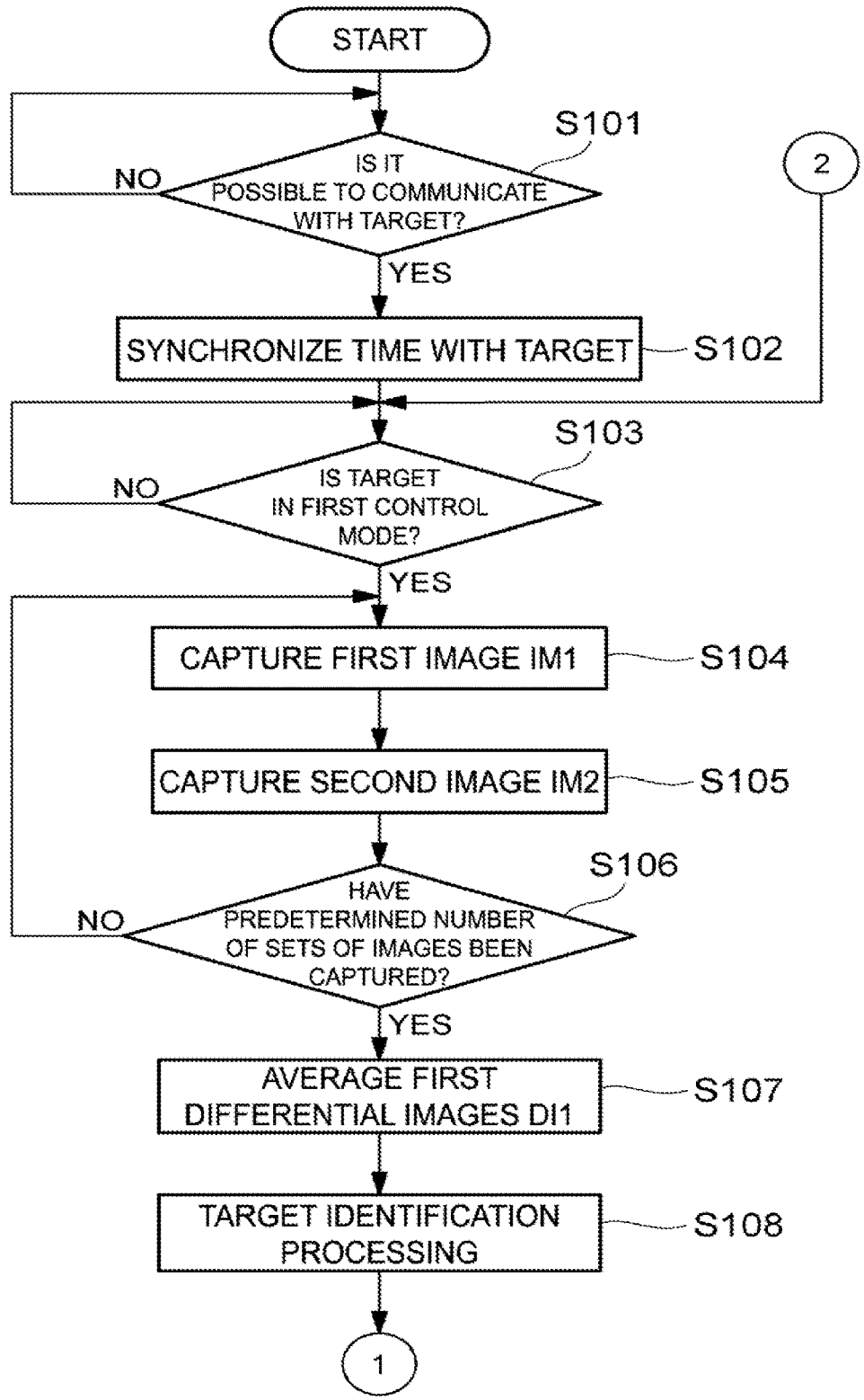
FIG. 8 is a flowchart illustrating processing performed by a survey device.
Figure 9:
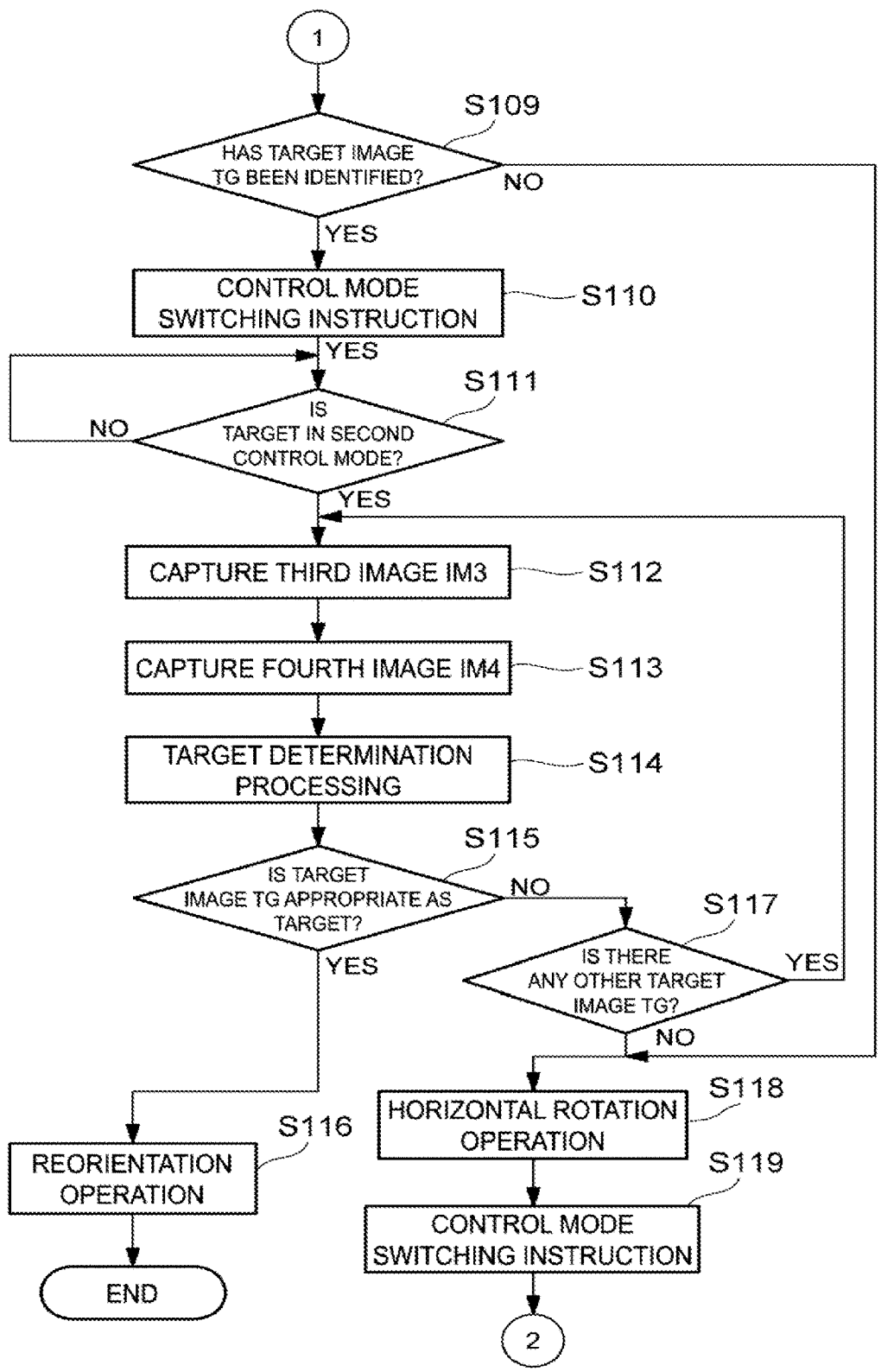
FIG. 9 is a flowchart illustrating processing performed by a survey device.

FIG. 8 and FIG. 9 are flowcharts illustrating processing performed by the survey device 100. Each of the processing illustrated in FIG. 8 and FIG. 9 is processing performed as a result of the control unit 140 of the survey device 100 executing a program.

At step S101, the control unit 140 determines whether the communication unit 170 of the survey device 100 can communicate with the communication unit 240 of the target 200, and in a case of YES, the control unit 140 advances the processing to step S102.

At step S102, the control unit 140 receives the time information on the target 200 through the communication unit 170 of the survey device 100 and synchronizes the time of the survey device 100 and the time of the target 200. Here, the synchronization refers to calculating a time difference between the time of the target 200 and the time of the survey device 100 and matching operational timings between the target 200 and the survey device 100 in consideration of the time difference, for example.

At step S103, the control unit 140 determines whether the target 200 is performing the first control mode, and in a case of YES, the control unit 140 advances the processing to step S104. For example, the control unit 140 issues an inquiry about the control mode performed by the target 200 via the communication unit 170. In a case that the control mode received from the target 200 indicates the first control mode, the control unit 140 determines YES at step S103.

At step S104, the control unit 140 controls the wide angle imaging unit 130 so as to cause the wide angle imaging unit 130 to capture the first image IM1. As illustrated in FIG. 6, the control unit 140 causes the wide angle imaging unit 130 to capture the first image IM1 during the on-periods in which the laser light is emitted from the emission unit 210.

At step S105, the control unit 140 controls the wide angle imaging unit 130 so as to cause the wide angle imaging unit 130 to capture the second image IM2. As illustrated in FIG. 6, the control unit 140 causes the wide angle imaging unit 130 to capture the second image IM2 during the off-periods in which the laser light is not emitted from the emission unit 210.

At step S106, the control unit 140 determines whether a predetermined number of sets (three sets, for example) of the first image IM1 and the second image IM2 have been captured, and in a case of YES, the control unit 140 advances the processing to step S107. The control unit 140 repeatedly performs step S104 and step S105 until the predetermined number of sets of the images are captured.

At step S107, the control unit 140 calculates a first differential image DI1, between the first image IM1 and the second image IM2, for each of the predetermined number of sets and averages pixel values of each pixel of the predetermined number of first differential images DI1. By performing the averaging processing, effects of light interference can be reduced. Note that at step S107, in a case that a pixel in the first differential image DI1 has a pixel value that is a predetermined value or less, processing may be performed to set the pixel value to zero.

At step S108, the target identification unit 141 of the control unit 140 performs target identification processing that identifies a target image TG on the basis of the first differential images DI1 averaged at step S107.

Figure 11:
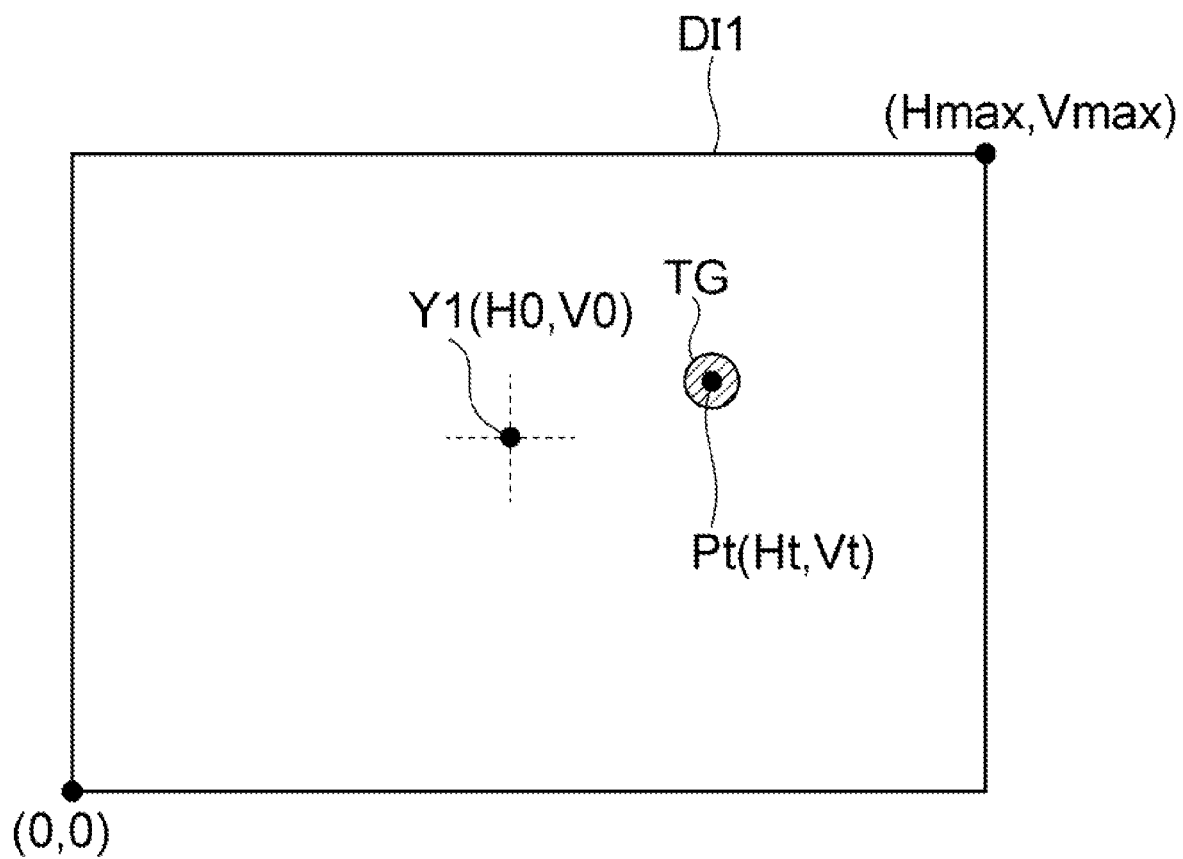
FIG. 11 is a diagram illustrating an example of a first differential image between a first image and a second image.

Here, the target identification processing performed by the target identification unit 141 will be described with reference to FIG. 11. FIG. 11 is a diagram illustrating an example of the first differential image DI1 between the first image IM1 and the second image IM2. In the first differential image DI1 illustrated in FIG. 11, a section in which the pixel value is greater than the predetermined value is illustrated by hatching. The control unit 140 identifies, in the first differential image DI1, a region in which the pixel value is greater than the predetermined value as the target image TG in the image. FIG. 11 is an example in which the single target image TG is identified. In a case that a plurality of sections exist in which the pixel value is greater than the predetermined value, the control unit 140 identifies a plurality of regions as the target images TG.

As illustrated in FIG. 11, in the target identification processing, the target identification unit 141 defines a center of gravity position of the region identified as the target image TG, as coordinates (Ht, Vt) of the target image TG, for example. In the first differential image DI1 illustrated in FIG. 11, coordinates, which indicate a coordinate H of the horizontal pixels and a coordinate V of the vertical pixels, are illustrated as (H, V). The first differential image DI1 is an image having an entire region from (0, 0) to (Hmax, Vmax). Y1 (H0, V0) indicates coordinates, in the first differential image DI1, that coincide with the collimation axis Y1 of the telescope 120.

At step S109, the control unit 140 determines whether the target image TG has been identified in the target identification processing at step S108, and in a case that at least one of the target images TG has been identified in the image, the control unit 140 advances the processing to step S110.

At step S110, the control unit 140 controls the communication unit 170 so as to cause the communication unit 170 to transmit a control mode switching instruction for instructing the target 200 to switch from the first control mode to the second control mode, to the target 200.

At step S111, the control unit 140 determines whether the target 200 is performing the second control mode, and in a case of YES, the control unit 140 advances the processing to step S112. For example, the control unit 140 issues an inquiry about the control mode performed by the target 200 via the communication unit 170. The control unit 140 determines YES at step S111 in a case that the control mode received from the target 200 indicates the second control mode.

At step S112, the control unit 140 controls the wide angle imaging unit 130 so as to cause the wide angle imaging unit 130 to capture the third image IM3. As illustrated in FIG. 7, the control unit 140 causes the wide angle imaging unit 130 to capture the third image IM3 during the incident periods in which the laser light (the fan beam) from the emission unit 210 is incident on the wide angle imaging unit 130.

At step S113, the control unit 140 controls the wide angle imaging unit 130 so as to cause the wide angle imaging unit 130 to capture the fourth image IM4. As illustrated in FIG. 7, the control unit 140 causes the wide angle imaging unit 130 to capture the fourth image IM4 during the non-incident periods in which the laser light (the fan beam) from the emission unit 210 is not incident on the wide angle imaging unit 130.

At step S114, the target determination unit 142 of the control unit 140 performs target determination processing that determines whether the target image TG in the image identified by the target identification unit 141 is appropriate as the target 200, on the basis of a second differential image DI2 between the third image IM3 captured at step S112 and the fourth image IM4 captured at step S113.

Figure 12:
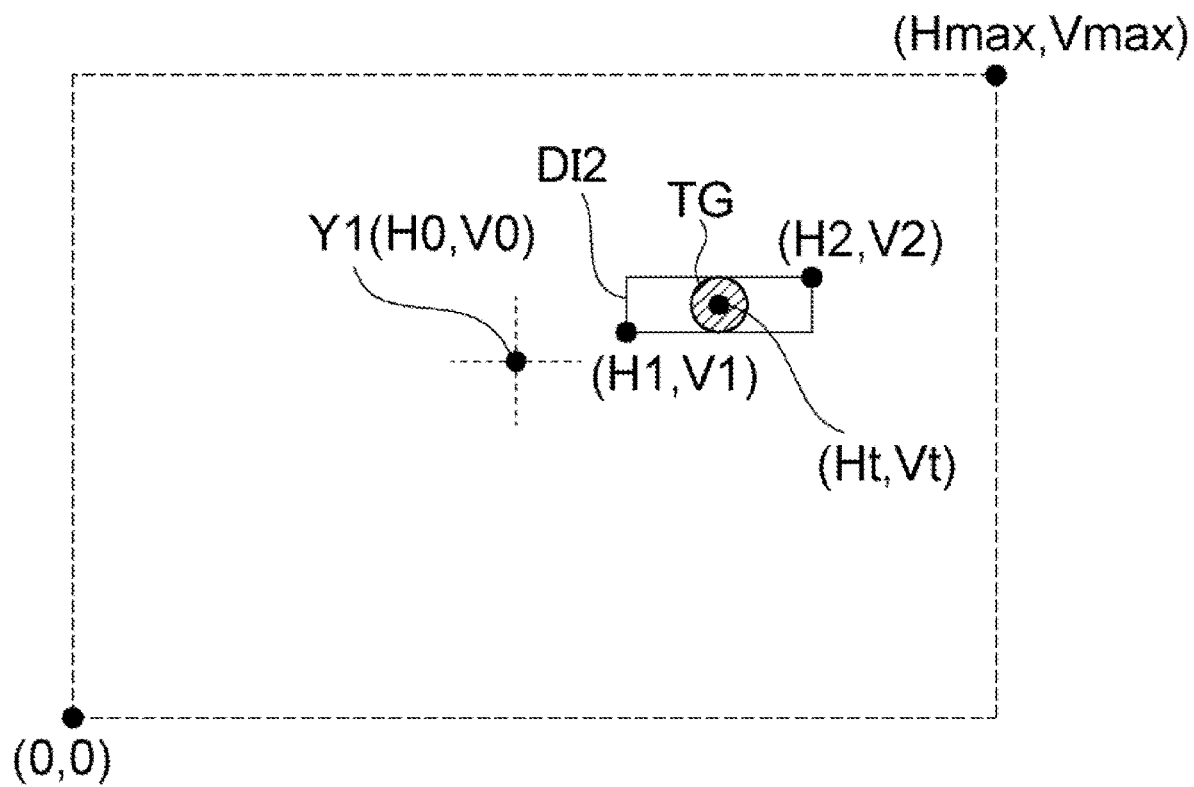
FIG. 12 is a diagram illustrating an example of a second differential image between a third image and a fourth image.

Here, the target determination processing performed by the target determination unit 142 will be described with reference to FIG. 12. FIG. 12 is a diagram illustrating an example of the second differential image DI2 between the third image IM3 and the fourth image IM4.

The first differential image DI1 illustrated in FIG. 11 is the image having the entire region from (0, 0) to (Hmax, Vmax). Meanwhile, the second differential image DI2 illustrated in FIG. 12 is a partial image of a region from (H1, V1) to (H2, V2). Here, the region from (H1, V1) to (H2, V2) is a region that includes the target image TG in the image identified by the target identification unit 141.

At step S112 described above, the third image IM3 captured by the wide angle imaging unit 130 is a partial image covering the region from (H1, V1) to (H2, V2), of the image covering the region from (0, 0) to (Hmax, Vmax), which is the entire region. Similarly, at step S113 described above, the fourth image IM4 captured by the wide angle imaging unit 130 is a partial image covering the region from (H1, V1) to (H2, V2), of the image covering the region from (0, 0) to (Hmax, Vmax), which is the entire region.

In a case where there is a region, in the second differential image DI2, in which the pixel value is greater than a predetermined value, the target determination unit 142 determines that the target image TG in the image identified by the target identification unit 141 is appropriate as the target 200.

At step S115, in a case where it is determined, in the target determination processing at step S114, that the target image TG is appropriate as the target 200, the control unit 140 advances the processing to step S116. On the other hand, in a case where it is determined, in the target determination processing at step S114, that the target image TG is not appropriate as the target 200, the control unit 140 advances the processing to step S117.

At step S116, the control unit 140 performs a reorientation operation on the basis of a position of the target image TG, which has been determined to be appropriate at step S115. The reorientation operation is an operation of controlling the horizontal drive unit 151 and the vertical drive unit 152 such that the center of the prism 230 is arranged at the position of Y1 (H0, V0), which coincides with the collimation axis Y1 of the telescope 120.

In the image region from (0, 0) to (Hmax, Vmax) captured by the wide angle imaging unit 130, the control unit 140 calculates a target horizontal rotation angle centered around the vertical axis Z1 and a target vertical rotation angle centered around the horizontal axis X1, on the basis of relative coordinates (Ht–H0, Vt–V0) of the coordinates (Ht, Vt) of the target image TG in the image with respect to Y1 (H0, V0). The drive control unit 143 controls the horizontal drive unit 151 so as to cause the horizontal rotation angle to match the calculated target horizontal rotation angle and controls the vertical drive unit 152 so as to cause the vertical rotation angle to match the calculated target vertical rotation angle.

The control unit 140 ends the processing of this flow in a case that the reorientation operation is completed. Note that, after the completion of the reorientation operation, the control unit 140 may use the tracking unit 160 to perform an operation (an automatic tracking operation) of controlling the horizontal drive unit 151 and the vertical drive unit 152 such that the center of the prism 230 is arranged on the collimation axis Y1 of the telescope 120.

At step S117, the control unit 140 determines, whether there are any other target images TG that are not determined as target 200 performed at step S114, among the target images TG identified at step S109. In a case of YES, the control unit 140 advances the processing to step S112, and in a case of NO, the control unit 140 advances the processing to step S118. In a case that the processing advances to step S112, a read-out position is changed to a region that includes the other target image TG, and the third image IM3 and the fourth image IM4 are captured. In this way, the processing from step S112 to step S115 is repeated until one of the target images TG identified at step S109 is determined to be appropriate as the target 200 at step S115.

At step S118, the control unit 140 performs a horizontal rotation operation, since there is no position of the target image TG that has been determined to be appropriate in the target determination processing at step S114. The horizontal rotation operation is an operation of rotating the main body 110 around the vertical axis Z1. The drive control unit 143 controls the horizontal drive unit 151 such that the main body 110 is rotated at a rotation angle equal to or less than the second angle of view θ2. By rotating the main body 110 at the rotation angle equal to or less than the second angle of view θ2, the wide angle imaging unit 130 can be re-orientated to a range that has not been imaged by the wide angle imaging unit 130.

At step S119, the control unit 140 controls the communication unit 170 so as to cause the communication unit 170 to transmit the control mode switching instruction for instructing the target 200 to switch from the second control mode to the first control mode, to the target 200. In a case where step S119 ends, the control unit 140 advances the processing to step S103.

Next, operations performed by the target 200 will be described with reference to FIG. 10.

Figure 10:
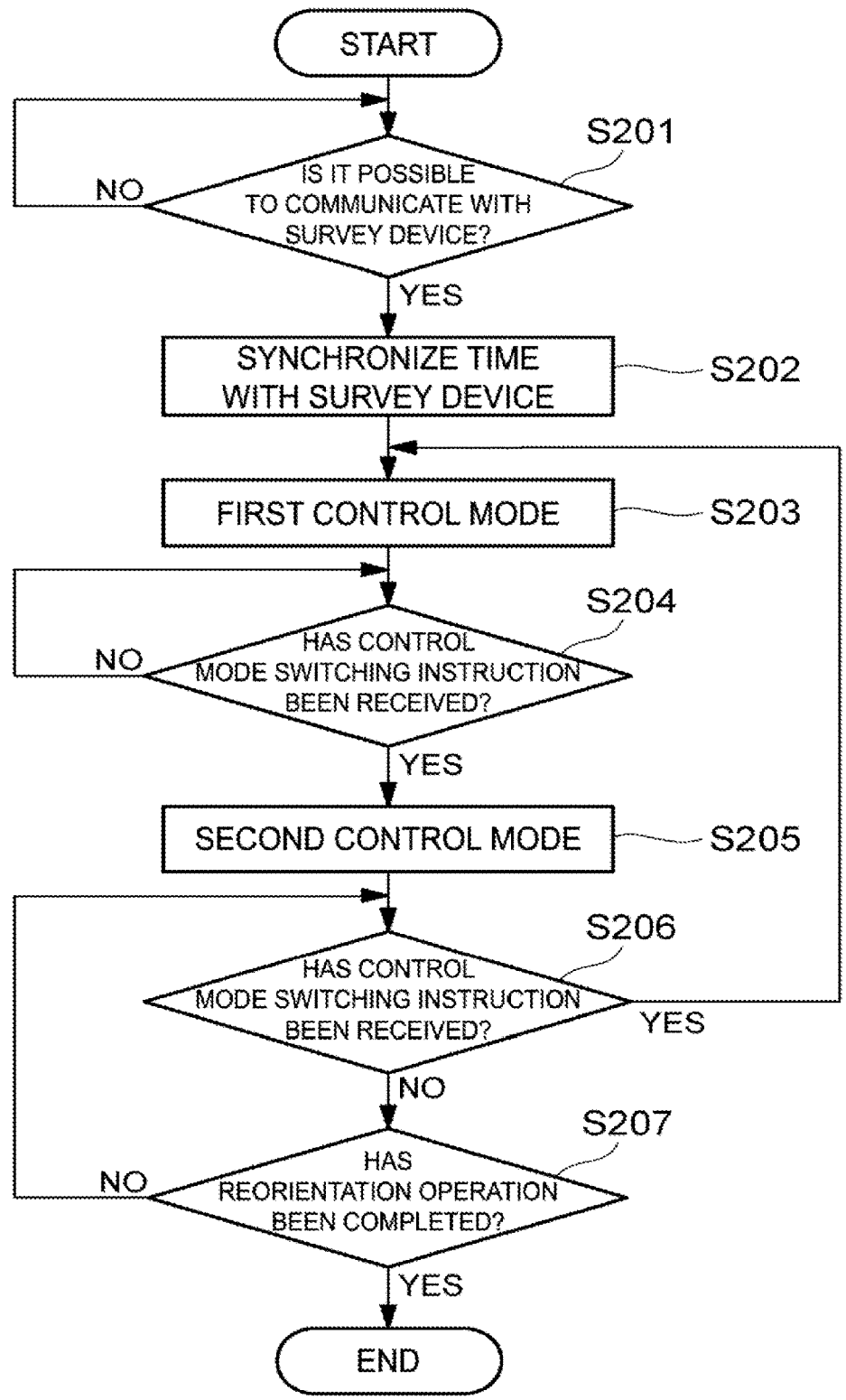
FIG. 10 is a flowchart illustrating processing performed by a target.

FIG. 10 is a flowchart illustrating processing performed by the target 200. Each of the processing illustrated in FIG. 10 is processing performed as a result of the control unit 220 of the target 200 executing a program.

At step S201, the control unit 220 determines whether the communication unit 240 of the target 200 can communicate with the communication unit 170 of the survey device 100, and in a case of YES, the control unit 220 advances the processing to step S202.

At step S202, the control unit 220 receives the time information on the survey device 100 through the communication unit 240 of the target 200, and synchronizes the time of the target 200 and the time of the survey device 100. Here, for example, the synchronization refers to calculating the time difference between the time of the survey device 100 and the time of the target 200, and matching the operational timings between the target 200 and the survey device 100 in consideration of the time difference.

At step S203, the control unit 220 performs the first control mode in which the laser light source 213 for emitting the laser light is repeatedly turned on and off at the first cycle C1.

At step S204, the control unit 220 determines whether the control mode switching instruction for instructing that target 200 to switch from the first control mode to the second control mode has been received from the survey device 100, and in a case of YES, the control unit 220 advances the processing to step S205.

At step S205, the control unit 220 performs the second control mode in which the on-state in which the laser light source 213 emits the laser light is maintained.

At step S206, the control unit 220 determines whether the control mode switching instruction for instructing the target 200 to switch from the second control mode to the first control mode has been received from the survey device 100. In a case of YES, the control unit 220 advances the processing to step S203, and in a case of NO, advances the processing to step S207.

At step S207, the control unit 220 makes an inquiry, to the survey device 100, about whether the reorientation operation to the target 200 has been completed. In a case that information indicating that the reorientation operation has been completed is received from the survey device 100 via the communication unit 240, the control unit 220 determines YES and ends the processing of this flow.

Effects and benefits exhibited by the survey system 300 of the present embodiment described above will be described below.

According to the survey system 300 of the present embodiment, since the second angle of view θ2 of the wide angle imaging unit 130 is wider than the first angle of view θ1 of the telescope 120, for the target 200 not present in the first angle of view θ1, in a case that the target 200 is present in the second angle of view θ2, the laser light from the target 200 is incident on the wide angle imaging unit 130. In this case, in a case that the control unit 220 performs the first control mode, the first image IM1, which is captured by the wide angle imaging unit 130 during the on-period in which the laser light is emitted, is an image including the laser light incident from the target 200. On the other hand, in a case that the control unit 220 performs the first control mode, the second image IM2, which is captured by the wide angle imaging unit 130 during the off-period in which the laser light is not emitted, is an image that does not include the laser light incident from the target 200. The first differential image DI1 between the first image IM1 and the second image IM2 is an image from which any influence of incident light other than the laser light incident from the target 200 is removed. Therefore, the target image TG in the image captured by the wide angle imaging unit 130 is identified on the basis of the first differential image DI1.

In this way, according to the survey system 300 of the present embodiment, for the target 200 not present in the first angle of view θ1, in a case that the target 200 is present in the second angle of view θ2, the position of the target 200 can be identified by capturing an image of the laser light incident from the target 200 by the wide angle imaging unit 130 without horizontally rotating the survey device 100. Thus, the position of the target 200 can be quickly identified even in a case where the target 200 is significantly separated from a position directly in front of the survey device 100 in the horizontal direction.

Further, according to the survey system 300 of the present embodiment, since the laser light emitted from the emission unit 210 is the fan beam B having the width W2 in the horizontal direction wider than the width W1 in the vertical direction, a sufficient amount of light can be transmitted over a significant distance even with a small amount of electric power. In addition, since the scanning with the fan beam B is continuously performed in the vertical direction, the fan beam B having the narrow width in the vertical direction can be expanded to the scanning width θ4 and transmitted.

In a case that the target identification unit 141 identifies the target image TG, and there is an object other than the target 200 that emits light at an interval equivalent to the imaging interval between the first image IM1 and the second image IM2, the target identification unit 141 may erroneously identify the object other than the target 200 as the target image TG. Thus, in the survey system 300 of the present embodiment, the second cycle C2 at which the emission unit 210 continuously performs scanning with the fan beam B in the vertical direction is set to be shorter than the first cycle C1 at which the laser light is repeatedly turned on and off in the first control mode, and it is determined whether the target image TG identified by the target identification unit 141 is appropriate on the basis of the second differential image DI2 between the third image IM3 and the fourth image IM4. Since the imaging interval between the third image IM3 and the fourth image IM4 is shorter than the imaging interval between the first image IM1 and the second image IM2, it is possible to remove the target image TG erroneously identified by the target identification unit 141 as the target 200 and determine whether the target image TG is appropriate.

In addition, according to the survey system 300 of the present embodiment, since the third image IM3 and the fourth image IM4 are the partial images, a time for acquiring the third image IM3 and the fourth image IM4 from the wide angle imaging unit 130 is significantly reduced compared to a case of handling the entire image that can be captured by the wide angle imaging unit 130. Therefore, even in a case where a time for the wide angle imaging unit 130 to acquire the entire image is longer than the second cycle C2, the time for the wide angle imaging unit 130 to acquire the third image IM3 and the fourth image IM4 can be made shorter than the second cycle C2.

An embodiment of the invention has been described above. However, the invention is not limited to the embodiment described above, and various changes can be made without departing from the scope of the claims. The configuration of the above-described embodiment can be partially omitted or can be freely combined in a manner different from the above.

REFERENCE SIGNS LIST

100 Survey device
110 Main body
111 Leveling stand
112 Housing
120 Telescope
130 Wide angle imaging unit
140 Control unit
141 Target identification unit
142 Target determination unit
143 Drive control unit
150 Drive unit
151 Horizontal drive unit (first drive unit)
152 Vertical drive unit (second drive unit)
153 Horizontal angle detector
154 Vertical angle detector
160 Tracking unit
161 Tracking light transmission unit
162 Tracking light receiving unit
170 Communication unit
180 Storage unit
190 Distance meter
193 Display unit
195 Operating unit
197 Tripod
200 Target
210 Emission unit
220 Control unit (emission control unit)
230 Prism
240 Communication unit
300 Survey system
TG Target image
X1 Horizontal axis
Y1 Collimation axis
Z1 Vertical axis
θ1 First angle of view
θ2 Second angle of view

What is claimed is:

1. A survey system comprising:
a survey device; and
a target to be collimated by the survey device,
wherein the survey device includes:
a main body rotatable around a vertical axis;
a telescope supported by the main body and rotatable around a horizontal axis;
an imaging unit having a second angle of view wider than a first angle of view of the telescope; and
a target identification unit configured to identify, based on an image captured by the imaging unit, a target image in the image,
the target includes an emission unit configured to emit laser light, wherein the emission unit is configured to perform continuous scanning, in the vertical direction, with a fan beam having a width in the horizontal direction wider than a width in the vertical direction, and
the target identification unit is configured to identify the target image, based on a first differential image between a first image and a second image, the first image being captured by the imaging unit during an on-period in which the laser light is emitted from the emission unit, and the second image being captured by the imaging unit during an off-period in which the laser light is not emitted from the emission unit.

2. The survey system according to claim 1,
wherein the target includes an emission control unit configured to control on and off of the laser light emitted from the emission unit,
the emission control unit is capable of performing a first control mode in which the on and off of the laser light is repeated at a first cycle and a second control mode in which an on-state of the laser light is maintained,
the emission unit is configured to perform continuous scanning with the fan beam in the vertical direction at a second cycle shorter than the first cycle,
the target identification unit is configured to identify the target image, based on the first differential image in a case that the emission control unit performs the first control mode, and
the survey device further includes:
a target determination unit configured to determine, in a case that the emission control unit performs the second control mode, whether the target image identified by the target identification unit is appropriate, based on a second differential image between a third image and a fourth image, the third image being captured by the imaging unit during an incident period in which the fan beam is incident on the imaging unit, and the fourth image being captured by the imaging unit during a non-incident period in which the fan beam is not incident on the imaging unit.

3. The survey system according to claim 2,
wherein the third image and the fourth image are partial images corresponding to the target image identified by the target identification unit.

4. The survey system according to claim 2,
wherein the survey device further includes:
a first drive unit configured to rotate the main body around the vertical axis;
a second drive unit configured to rotate the telescope around the horizontal axis; and
a drive control unit configured to control the first drive unit and the second drive unit, and
the drive control unit is configured to control the first drive unit and the second drive unit in accordance with the target image identified by the target identification unit such that the telescope is collimated on the target.

5. The survey system according to claim 1,
wherein the emission unit includes:
a polygon mirror including a plurality of reflection surfaces formed at equal intervals along a circumferential surface of the polygon mirror and being rotatable around a horizontal axis;

a rotation drive unit configured to rotate the polygon mirror; and a laser light source configured to emit the laser light toward the circumferential surface of the polygon mirror.

6. The survey system according to claim 4, wherein the survey device further includes:

a tracking light transmission unit configured to emit tracking light toward the target; and a tracking light receiving unit configured to receive the tracking light reflected by the target, the target further includes:

a prism configured to reflect the tracking light emitted from the tracking light transmission unit in an incident direction of the tracking light, and the drive control unit is configured to control the first drive unit and the second drive unit, based on a received light image of the tracking light receiving unit, such that the prism is arranged on a collimation axis of the telescope.

7. A method for identifying a target in a survey system including a survey device and a target to be collimated by the survey device, the survey device including a main body rotatable around a vertical axis, a telescope supported by the main body and rotatable around a horizontal axis, and an imaging unit having a second angle of view wider than a first angle of view of the telescope, and the target including an emission unit configured to emit laser light, the method for identifying the target comprising:

performing a continuous scanning by the emission unit in the vertical direction, with a fan beam having a width in the horizontal direction wider than a width in the vertical direction;

capturing a first image by the imaging unit during an on-period in which the laser light is emitted from the emission unit;

capturing a second image by the imaging unit during an off-period in which the laser light is not emitted from the emission unit; and identifying a target image in an image captured by the imaging unit, based on a first differential image between the first image and the second image.

* * * * *